United States Patent [19]

Anglin

[11] Patent Number: 5,178,953
[45] Date of Patent: Jan. 12, 1993

[54] MAGNETIC RECORDING MEDIA HAVING A BINDER COMPRISING A LOW MOLECULAR WEIGHT HIGH GLASS TRANSITION TEMPERATURE VINYL POLYMER

[75] Inventor: David L. Anglin, Sunnyvale, Calif.

[73] Assignee: Ampex Media Corporation, Redwood City, Calif.

[21] Appl. No.: 464,117

[22] Filed: Jan. 12, 1990

[51] Int. Cl.$^5$ ............................................. G11B 5/00
[52] U.S. Cl. ................................ 428/424.6; 428/425.9; 428/522; 428/694; 428/695; 428/900; 252/62; 252/54; 252/62.55; 252/62.56
[58] Field of Search ...................... 428/424.6, 694, 695, 428/900, 425.9, 522; 252/62.54, 62.55, 62.56

[56] References Cited

U.S. PATENT DOCUMENTS

| | | | |
|---|---|---|---|
| 3,650,828 | 3/1972 | Higashi et al. | 117/235 |
| 3,983,302 | 9/1976 | Zucker | 425/428 |
| 4,025,694 | 5/1977 | Pletcher et al. | 428/480 |
| 4,414,288 | 11/1983 | Kawahara et al. | 428/694 |
| 4,431,712 | 2/1984 | Matsufuji et al. | 428/692 |
| 4,609,380 | 9/1986 | Barnett et al. | 51/298 |
| 4,614,687 | 9/1986 | Nishimatsu et al. | 428/329 |
| 4,628,009 | 12/1986 | Nishimatsu et al. | 428/694 |
| 4,695,513 | 9/1987 | Hashimoto et al. | 428/425.9 |
| 4,783,370 | 11/1988 | Chernega et al. | 428/425.9 |
| 4,784,907 | 11/1988 | Matsufuji et al. | 428/328 |
| 4,851,465 | 7/1989 | Yamakawa et al. | 524/431 |

FOREIGN PATENT DOCUMENTS 1097613 1/1968 United Kingdom.

Primary Examiner—P. C. Sluby
Assistant Examiner—Stevan A. Resan
Attorney, Agent, or Firm—Gerald F. Swiss; William R. Johnson; Ralph L. Mossino

[57] ABSTRACT

Disclosed are magnetic particle coating compositions employing a low molecular, high $T_g$ vinyl polymers characterized by having one or more primary alcohol containing groups pendant to the polymer chain.

31 Claims, No Drawings

MAGNETIC RECORDING MEDIA HAVING A BINDER COMPRISING A LOW MOLECULAR WEIGHT HIGH GLASS TRANSITION TEMPERATURE VINYL POLYMER

BACKGROUND OF THE INVENTION

1. Field of the Invention

The present invention is directed to magnetic recording media. In particular, the present invention is directed to binder systems for use in such media, to the resulting media obtained by employing such binder systems as well as to methods for increasing the Tg of binder systems.

2. Statement of Art

Magnetic particle recording media generally comprise a non-magnetic substrate onto which a magnetic layer of metal particles or metal oxide particles has been placed. In turn, the magnetic layer is generally prepared from a magnetic particle coating composition comprising a solvent, the metal particles or metal oxide particles, a binder system and other optional ingredients including a lubricant, a dispersant, an abrasive, and the like. Typically, the magnetic particle coating composition is placed on (coated onto) the substrate and the composition cured resulting in the magnetic layer.

Conventional binder systems for use in such magnetic particle recording media include those containing a polyurethane resin, a vinyl chloride/vinyl acetate/vinyl alcohol terpolymer and a polyisocyanate. Upon curing of such binder systems, cross-linking (bonding) between the different binder components can occur, i.e., the hydroxyl groups on both a polyurethane polymer and a vinyl chloride/vinyl acetate/vinyl alcohol terpolymer can react with different isocyanate groups of the same polyisocyanate to form carbamate groups and thereby cross-link with each other through carbamate groups on what was originally the polyisocyanate.

While conventionally employed, these systems nevertheless possess properties which detrimentally affect the resulting magnetic particle recording media. In particular, a desirable characteristic of such media is that the magnetic layer in such media possess a high Tg, i.e., greater than about 30° C. Magnetic layers having a high Tg are particularly beneficial because higher Tg's correlate to improved durability and runnability in the resulting magnetic particle recording media. Additionally, magnetic layers having a higher Tg possess a lower coefficient of friction and are more stiff than magnetic layers with a lower Tg. This latter property is particularly significant as it relates to flexible magnetic particle recording media employed in recording instrumentation wherein a flexible medium, such as a film of polyethylene terephthalate, traverses a recording head because a stiffer film has better head to film contact. Head to film contact is especially critical for thin flexible media.

In spite of the desirability of employing high Tg components in the binder system, use heretofore of such components causes significant problems in the resulting magnetic particle recording media. In particular, when a high Tg polyurethane component is employed in the binder system for use in flexible magnetic particle media, the resulting magnetic layer is not very calenderable. On the other hand, the use of conventional high Tg vinyl chloride/vinyl acetate/vinyl alcohol terpolymers in such binder systems results in other problems. For instance, the use of a conventional low molecular weight, high Tg vinyl chloride/vinyl acetate/vinyl alcohol terpolymer in the binder system results in durability problems in the resulting recording media. Presumably, this problem arises because of the presence of unreacted terpolymer in the binder system which in turn results from the low reactivity of the hydroxyl groups of such terpolymers with the polyisocyanate. In order to overcome this problem arising from the use of such high Tg, low molecular weight terpolymers, it is conventional wisdom that high Tg, high molecular weight vinyl chloride/vinyl acetate/vinyl alcohol terpolymers be employed. Under these circumstances, even if these terpolymers do not react with the polyisocyanate and thereby cross-link with the polyurethane and other terpolymers through the polyisocyanate, durability problems will not arise because the terpolymers are of sufficiently high molecular weight to begin with. However, while use of these high molecular weight, high Tg terpolymers will overcome the durability problems previously encountered, it is also recognized in the art that magnetic layers resulting from coatings which use such terpolymers are more brittle than desired and that the calendering of flexible media employing such coatings generally requires several passes through the rolls in order to achieve an acceptable degree of gloss. However, in spite of these problems, such high molecular weight, high Tg terpolymers are conventionally employed because of the lack of a better alternative. In view of the above, there is a need in the art for a high Tg binder system which overcomes the problems encountered with conventional high Tg binder systems.

SUMMARY OF THE INVENTION

The present invention is directed to the use of low molecular weight, high Tg vinyl polymers additionally containing one or more primary hydroxyl groups to increase the Tg of both the binder system and the magnetic layer of the resulting magnetic recording media. Moreover, the binder systems described herein employing such resins provide for magnetic layers having the improved properties associated with higher Tg and also provide for magnetic particle film media having enhanced calenderability and less brittleness as compared to film media prepared from conventional binder systems. Accordingly, in one of its composition aspects, the present invention is directed to a magnetic particle coating composition for magnetic recording media which comprises a) magnetic particles, b) polyurethane, c) polyisocyanate, and d) a low molecular weight, high Tg vinyl polymer characterized by having one or more primary alcohol containing groups pendant to the non-terminal portions thereof.

In another of its composition aspects, the present invention is directed toward a magnetic particle recording media comprising a non-magnetic substrate having a magnetic layer placed thereon wherein said layer is derived from a magnetic particle coating composition which comprises a) magnetic particles, b) polyurethane, c) polyisocyanate, and d) a low molecular weight, high Tg vinyl polymer characterized by having one or more primary alcohol containing groups pendant to the non-terminal portions thereof.

In still another of its composition aspects, the present invention is directed toward a binder system for use in magnetic recording media which comprises a) polyurethane, b) polyisocyanate and c) a low molecular weight, high Tg vinyl polymer characterized by having one or more primary alcohol containing groups pendant to the non-terminal portions thereof.

In one of its method aspects, the present invention is directed toward a method of increasing the Tg of the magnetic layer of a magnetic recording medium, wherein said magnetic layer is derived from a magnetic particle coating composition comprising magnetic particles, polyurethane and polyisocyanate, said method comprises adding to said composition a low molecular weight, high Tg vinyl polymer characterized by having one or more primary alcohol containing groups pendant to the non-terminal portions thereof.

The compositions and methods disclosed herein now permit the use of high Tg magnetic layers in magnetic recording media without the detrimental affects previously encountered with high Tg magnetic layers derived from conventional binder systems. Moreover, magnetic recording media obtained from the use of the compositions disclosed herein additionally possess superior calenderability as compared to magnetic recording media obtained with conventional binder systems. Other advantages of this invention will become apparent from the following Detailed Description of the Preferred Embodiments and Examples.

DETAILED DESCRIPTION OF THE PREFERRED EMBODIMENTS

The compositions disclosed herein contain a low molecular weight, high Tg (Tg—glass transition temperature) vinyl polymer characterized by having one or more primary alcohol containing groups pendant to the non-terminal portions thereof and are employed as co-binders with the polyurethane. As noted above, use of high Tg polyurethane results in a flexible magnetic recording medium which is not very calenderable. Accordingly, the Tg of the polyurethane employed in the present compositions is preferably about 25° C. or less. However, as noted above, it is desirable that the magnetic layer employed in the magnetic particle, recording media have a high Tg, i.e., a Tg of about 30° C. or more; preferably about 40° C. or more and more preferably about 60° C or more. Therefore, the use of such polyurethanes in combination with the low molecular weight, high Tg vinyl polymers described herein provides a convenient way to increase the Tg of the resulting magnetic layer. Moreover, as also noted above, magnetic particle coating compositions employing such low molecular weight, high Tg vinyl polymers provide for magnetic layers which are characterized as being less brittle and more calenderable than magnetic layers derived from conventional compositions.

Suitable low molecular weight, high Tg vinyl polymers for use herein are characterized by having one or more primary alcohol containing groups pendant to its non-terminal portions. These vinyl polymers are copolymers, terpolymers, tetrapolymers and the like, and are readily prepared by polymerizing two or more polymerizable vinyl monomers ($CH_2$=CHR wherein R is the remainder of the vinyl monomer), e.g., vinyl chloride, vinyl acetate, acrylonitrile, acrylic acid, and the like optionally in combination with other polymerizable monomers such as maleic anhydride, 1,4-hexadiene, and the like. The specific monomers are selected in order to form random copolymers and are reacted under conditions which result in the formation of a low molecular weight, high Tg vinyl polymer. Such polymerizable monomers contain a reactive double bond which upon polymerization forms a vinyl polymer. The resulting vinyl polymer can then be derivatized so as to result in the formation of primary alcohol containing groups, i.e., —$CH_2OH$; pendant to the non-terminal portions of the polymer. For example, one method of preparing such a vinyl polymer is to start with a vinyl polymer containing at least one or more vinyl alcohol units in its non-terminal portions and to form esters on at least some of the vinyl alcohol units wherein the ester contains a primary alcohol containing group. That is to say that the vinyl alcohol moiety is reacted under esterifying conditions with a suitable carboxylic acid group containing a primary alcohol, i.e., $HOOCR_1CH_2OH$ wherein R1 is any suitable linking group which links the acid to the primary alcohol and includes linking groups such as alkylene of from 1 to 6 carbon atoms, phenyl, and the like. In this situation, it may be necessary to block the primary alcohol prior to esterification in order to prevent self-esterification and then to deblock the primary alcohol after esterification. Suitable blocking and deblocking reactions are well known in the art.

Another method of preparing vinyl polymers having one or more primary alcohol containing groups pendant to the non-terminal portion of the polymer is to employ monomers having both a polymerizable vinyl group and a primary alcohol containing group ("PVGPA"), i.e., $CH_2$=$CHR_2$ wherein R2 is a primary alcohol containing group. Suitable monomers include, for example, acrylic acid derivatives such as ethylene glycol monoacrylate, propylene glycol monoacrylate and the like, allyl alcohol, p-methylol styrene [e.g., $CH_2$=CH-$\phi$-CH2OH wherein the —CH2OH substitution is para to the $CH_2$=CH-substitution on the phenyl ($\phi$) group], and the like. The specific primary alcohol containing group pendant to the vinyl monomer is not critical provided that the primary alcohol is retained after polymerization. Accordingly, suitable primary alcohol containing groups which can be attached to the vinyl group include those wherein $R_2$ is —$CH_2OH$, —$CH_2CH_2OH$, —$CO_2C_2H_4OH$, —$CO_2C_3H_6OH$, —$\phi$—$CH_2OH$, and the like. However, in order to move the primary alcohol group further from the polymer backbone and thereby further minimize steric hinderance caused by the polymer backbone during the reaction of the alcohol groups with the polyisocyanate, preferred primary alcohol containing groups attached to the vinyl group include —$CO_2C_3H_6OH$, —$CO_2C_2H_4OH$, —$\phi$—$CH_2OH$, and the like.

In a preferred embodiment, such a monomer is then mixed with one or more other polymerizable vinyl monomers, such as acrylic acid, vinyl chloride, vinyl acetate, and the like, optionally in the presence of other polymerizable monomers such as maleic anhydride, 1,4-hexadiene, and the like, and the mixture polymerized under appropriate conditions to form a low molecular weight, high Tg vinyl polymer. Such conditions are well known in the art. Accordingly, by use of such monomers in combination with other appropriate monomer(s), it is possible to prepare low molecular weight, high Tg vinyl polymers containing one or more primary alcohol containing groups in the non-terminal portion of the polymer wherein the polymer is a copolymer of vinyl chloride and PVGPA, a copolymer of vinyl acetate and a PVGPA, a terpolymer of vinyl acetate, vinyl chloride and a PVGPA, a terpolymer of vinyl chloride, acrylonitrile and a PVGPA, a terpolymer of vinyl acetate, a PVGPA and maleic anhydride, a terpolymer of vinyl chloride, a PVGPA and maleic anhydride, a terpolymer of vinyl chloride, acrylic acid and a PVGPA, a terpolymer of butadiene, acrylonitrile and a PVGPA, a tetrapolymer of vinyl chloride, vinyl acetate, maleic anhydride and a PVGPA, and the like. The specific monomers employed are selected to have similar reactivity under polymerization conditions so as to result in random copolymers, terpolymers and the like and to provide for a polymer having a suitable molecular weight and Tg.

Additionally, low molecular weight, high Tg vinyl polymers having one or more primary alcohol containing groups pendant to the non-terminal portions of the polymer are commercially available. For example, such vinyl polymers are available from Union Carbide, 39 Old Ridgebury Rd., Danbury, Conn., under the tradenames VP-200, VYES-4 and VROH. Each of these polymers contains in the non-terminal portions of its backbone one or more primary alcohol units in the form

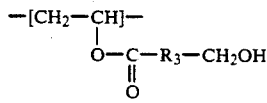

wherein $R_3$ is an alkylene group, generally of 2 to 3 carbon atoms. Because of their ready availability, these polymers are preferred in the magnetic particle coating compositions employed herein.

The low molecular weight, high Tg vinyl polymers for use in the magnetic particle coating compositions employed herein include those having a number average molecular weight of from about 800 to about 15,000 and a Tg of about 40 or more. Because lower molecular weight polymers are more soluble in the magnetic particle coating composition and impart improved calenderability to the magnetic recording film derived from coating compositions employing such polymers as compared to higher molecular weight polymers, the low molecular weight, high Tg polymers employed herein preferably have a number average molecular weight of about 10,000 or less and more preferably about 5,000 or less and most preferably about 3,000 or less, i.e., preferably having number average molecular weights of from about 800 to about 10,000, more preferably from about 800 to about 5,000 and most preferably from about 800 to about 3,000.

The ratio of monomer units in the low molecular weight, high Tg vinyl polymers employed herein is generally not critical provided that the resulting polymer has a requisite molecular weight and Tg and has at least one primary alcohol containing unit in the non-terminal portion of the polymer. However, because vinyl polymers containing hydroxyl numbers of about 2000 or more do not contain sufficient hydroxyl functionality required to impart improved properties to the vinyl polymer, the vinyl polymers employed herein preferably possess a hydroxyl number of about 2000 or less, and more preferably about 1000 or less. Moreover, because the vinyl polymers having a low hydroxyl number, i.e., about 150 or less, will result in lowering the Tg of the vinyl polymer, the vinyl polymers employed herein preferably have a hydroxyl number of greater than about 150 and preferably greater than about 300. Thus, in a preferred embodiment, the vinyl polymers employed herein preferably have a hydroxyl number from about 150 to about 2000 and more preferably from about 300 to about 1000.

The low molecular weight, high Tg vinyl polymers described herein can be employed as the only cobinder with the polyurethane and polyisocyanate (i.e., they replace all of the conventional high molecular weight vinyl polymer); or, alternatively, can be employed as a substitute for a portion of the conventional high molecular weight (number average molecular weights about 20,000 or more), high Tg vinyl polymers and/or as a substitute for a portion of the polyurethane in the binder system.

The magnetic particle coating composition employed herein additionally contains a polyurethane component (resin). Examples of suitable polyurethane resins include polyester polyurethane resins produced by the reaction of polyester polyols or lactone polyester polyols produced from lactones (e.g., epsilon-caprolactone and gamma-butryolactone) with diisocyanate compounds, polycarbonate polyurethanes produced by a similar reaction as the polyester polyurethanes but wherein the polyester polyol is replaced with a polycarbonate polyol, and polyether polyurethane resins produced by the reaction of polyether polyols derived from ethylene oxide, propylene oxide or butylene oxide with diisocyanate compounds. The polyester polyols are produced by reacting organic dibasic acids such as saturated or unsaturated dicarboxylic acids (e.g., maleic acid, adipic acid, and the like), alicyclic dicarboxylic acids (e.g., norborene dicarboxylic acid) or aromatic dicarboxylic acids (e.g., phthalic acid) with one or more polyols selected from glycols (e.g., ethylene glycol, propylene glycol, diethylene glycol and polyethylene glycol), polyvalent alcohols (e.g., trimethylolpropane, hexanetriol, glycerine and pentaerythritol) and polyvalent phenols (e.g., hydroquinone and bisphenol A). Examples of the diisocyanate compounds include aromatic diisocyanates (e.g., tolylene diisocyanate, xylylene diisocyanate and 4,4'-diphenylmethane diisocyanate) and aliphatic diisocyanates (e.g., hexamethylene diisocyanate). These polyurethane resins can be terminated with an isocyanate group, a hydroxyl group or carboxyl group or mixtures thereof. Additionally, mixtures of two or more polyurethanes can be employed. The polyurethane resins generally have a number average molecular weight of from about 10,000 to about 200,000.

In order to facilitate cross-linking, the polyurethane employed herein preferably has one or more pendant primary alcohol containing groups. Polyurethanes having such pendant primary alcohol containing groups are commercially available under the tradename RD 4606-03 (available from Lord Corporation, Erie, Pa.). Moreover, as noted above, polyurethanes having a Tg of greater than about 25° C. result in magnetic recording film media possess poor calenderability. Accordingly, in a preferred embodiment, the polyurethanes employed herein have a Tg of about 25° C or less.

The magnetic particle coating compositions employed herein additionally employ a polyisocyanate component whose function in part is to cross-link one or more of the polyurethane resin and/or vinyl polymer components. The polyisocyanate generally contain two or more isocyanate groups and are well known in the art. Polyisocyanate components containing two isocyanate groups are described above and are commercially available. For example, diisocyanates are available from Mobay Corp., Coating Division, Pittsburgh, Pa. under the tradenames of Desmodur E-1361, Desmodur E-21, Desmodur N-3390 and Desmodur Z-4370. Likewise, polyisocyanates containing 3 or more isocyanate groups are known in the art and are also commercially available. For example, polyisocyanates are available from Mobay Corp., Coating Division, Pittsburgh, Pa. under the tradenames Mondur DB, Desmondur IL, Desmondur N-75, Desmondur N-100,° CB-701 and Desmondur N-300. In another of its functions, the polyisocyanate reacts with water in the coating compositions to form polyureas.

In general, the combination of vinyl polymer, polyurethane and polyisocyanate is often described in the art as the "binder system" insofar that upon curing, these components will cross-link and bind the magnetic particles to the substrate. The binder systems described herein can employ a wide range of ratios of each component to each other. The specific ratio employed depends upon the intended format in which the magnetic particle recording media will be employed. A skilled artisan can readily determine appropriate ratios of the these components based on its intended format. For example, magnetic particle recording media formatted for use in professional video recording will generally employ a ratio of from about 1 to about 80 weight percent (preferably from about 5 to 60 weight percent) vinyl polymer, from about 20 to about 98 weight percent polyurethane (preferably from about 20 to 94 weight percent) and from about 1 to about 50 weight percent of polyisocyanate all relative to the total weight of the vinyl polymer, polyurethane and polyisocyanate employed.

The binder system is part of the magnetic particle coating composition which also contains an organic solvent. The organic solvent acts as a convenient vehicle to mix the various components of the magnetic particle coating composition and to apply this composition onto the substrate. Cyclohexanone is a common solvent used in magnetic particle coating compositions but other suitable organic solvents including methyl ethyl ketone, methyl isobutyl ketone, ethyl acetate, butyl acetate, tetrahydrofuran, toluene, chloroform, carbon tetrachloride, and the like can be employed provided that the solvent is compatible with the binder system and the additives being used, and the substrate on which the coating is to be applied. Preferably, the organic solvent is a ketone solvent and most preferably is cyclohexanone. In addition, when ketone solvents are employed, other solvents can also be present in the magnetic particle coating composition such as toluene, tetrahydrofuran and other organic solvents which are compatible with the ketone solvents, the binder system and additives being used, and the substrate on which the coating is to be applied.

After application of the magnetic particle coating composition onto the substrate, the solvent is evaporated, and the binder system cured which results in the formation of the magnetic layer on the substrate. When a flexible substrate is employed, after evaporation of the solvent, the flexible substrate, now containing the coating composition minus the solvent, is then calendered and the binder system cured.

The solvents used in magnetic particle coating compositions may be present in amounts up to about 75% by weight based on the total weight of the coating composition. It is generally desirable to avoid the use of excess solvent due to the increased time and energy required to remove the solvent from the coating after it is applied to the substrate. The solvent should generally be present in at least sufficient amount to dissolve or dilute the composition to the desired degree, provide the desired degree of consistency or viscosity of the magnetic particle coating composition for coating the substrate, as well as to solubilize or suspend the other additives and components present in the coating composition. In this regard, one of the particular advantages of using a high Tg, low molecular weight vinyl polymer is that these polymers are generally more soluble in the organic solvent and accordingly permit the use of less solvent while simultaneously providing equal or reduced viscosity to the magnetic particle coating composition as compared to coating compositions prepared using conventional vinyl polymers.

In general, the solvent will be present in at least about 40 percent by weight based on the weight of the magnetic particle coating composition. More particularly, when the magnetic particles are metal particles, the solvent is generally present from about 45 to about 75 percent by weight based on the weight of the coating composition and more preferably about 66 weight percent based on the weight of the coating composition; whereas, when the magnetic particles are metal oxide particles, the solvent is generally present from about 40 to about 75 percent by weight based on the weight of the coating composition and preferably about 68 weight percent based on the weight of the coating composition. When a ketone solvent is used in combination with other organic solvents in the coating composition, the ketone solvent will usually comprise at least about 1 percent by weight, and preferably, at least about 20 percent by weight based on the total weight of the coating composition.

The magnetic particles employed in combination with the herein disclosed magnetic particle coating compositions to form the magnetic layer are either ferromagnetic metal particles or ferromagnetic metal oxide particles. Ferromagnetic metal particles are generally alpha iron, especially alpha iron metal powder; whereas ferromagnetic metal oxide particles include iron oxide, barium ferrite as well as compositions of iron oxide containing additional metal oxides such as cobalt oxides and the like. In general, the magnetic particles are present in the magnetic particle coating composition at from about 28 volume percent to about 52 volume percent based on the total volume of the magnetic particle coating composition (absent the organic solvent).

Ferromagnetic metal particles are generally unstable in the presence of oxygen and when exposed to air are easily oxidized and in some cases tend to be pyrophoric. Accordingly, when ferromagnetic metal particles are employed herein, these particles have been preferably stabilized against undesired oxidation in a number of different ways, including oxidizing the surfaces of the ferromagnetic metal particles under controlled conditions to form a protective oxide layer on the surface of each particle, or coating the ferromagnetic particles with a film or coating of a polymer to form a protective film or coating on the particles which provides some degree of oxidative stability. Specific procedures for forming oxidatively stabilized particles are well known in the art.

However, it is also recognized that even when such oxidatively stabilized ferromagnetic metal particles are employed in a coating composition containing a ketone solvent, these ferromagnetic metal particles can catalyze the formation of ketone solvent dimers. In turn, the presence of such solvent dimers imparts undesirable properties to the resulting magnetic layer. Accordingly, when a ketone solvent is employed, it is preferable that the oxidatively stabilized ferromagnetic metal particles be deactivated as catalysts in the formation of solvent dimers. In general, the metal particles can be deactivated by combining the particles with a deactivating amount of an appropriate reagent either prior to or at the same time the ketone solvent is combined with the particles. For example, the reagent can be precombined with the ferromagnetic metal particles prior to addition of such particles to the magnetic particle coating composition. Alternatively, the particles can be combined with the reagent in the magnetic particle coating composition prior to milling or at the time of milling.

Appropriate reagents for use in deactivating the metal particles include organic compounds having from 2 to about 24 carbon atoms and having at least two functional groups selected from the group consisting of carboxylic acid, sulfonate and phosphonate groups. Particularly preferred deactivating reagents include dicarboxylic acids such as oxalic acid, adipic acid, succinic acid, sebacic acid, maleic acid, decanedicarboxylic acid, and dodecanedicarboxylic acid.

The magnetic particle coating composition is formed by combining the binder system with the ferromagnetic particles, the organic solvent and any other additive (e.g., lubricant, abrasive, dispersant and the like) desired in the magnetic particle coating composition. The exact order of components is not critical provided that if ferromagnetic metal particles and a ketone solvent are employed, such particles are deactivated toward catalyzing ketone solvent dimers either simultaneously with or prior to the addition of the ketone solvent. After combining all of the components, the mixture is generally milled to disperse the magnetic particles.

The resulting magnetic particle coating composition is then applied to the substrate by conventional methods known per se. For example, the magnetic particle coating composition can be applied to the substrate by coating the composition onto the substrate, dipping the substrate in the composition or transferring the composition contained in a back coating onto the surface of the substrate in a wound state. The thickness of the resulting magnetic layer so applied onto the substrate is generally from about 0.5 to about 13 microns; although preferably, from about 0.5 to about 5 microns.

The substrate employed to support the magnetic layer is any conventional non-magnetic substrate, including rigid and flexible substrates. For example, in rigid disc recording media, an aluminum substrate is commonly used. In flexible tape and recording media, a film of polyester (such as polyethylene terephthalate), polyimide, polyaramid and the like is commonly used as the substrate.

After application of the magnetic particle coating composition, the solvent is removed and the binder system is allowed to cure. As noted above, when a flexible substrate is employed, the substrate and coating are commonly calendered after solvent evaporation. One of the particular advantages obtained from using the low molecular weight, high Tg vinyl polymer described herein in the magnetic particle coating composition is that these polymers readily react with the polyisocyanate and thereby form cross-linked products with other vinyl polymers as well as with the polyurethane present in the composition. Without being limited to any theory, it is believed that the primary alcohol containing groups pendant to these vinyl polymers permit these vinyl polymers to readily react with the polyisocyanate so as to form cross-linked products and that accordingly, after several days of curing, substantially no unreacted vinyl polymer remains in the magnetic layer. In turn, the durability problems described above with the use of conventional prior art low molecular weight, high Tg vinyl polymers are no longer encountered with the magnetic recording media obtained from the coating compositions of this invention; presumably because there are no significant amounts of unreacted vinyl polymer in the magnetic layer.

On the other hand and again without being limited to such a theory, it is believed that conventional vinyl alcohol containing vinyl polymers (which contain only secondary alcohols in the internal regions of the polymer but may contain primary alcohol groups at the terminal portions of the polymer) react less readily with the polyisocyanate and that accordingly, significant amounts of this polymer remains unreacted after several days of curing. It is further believed that the poorer reactivity arises because the secondary alcohols as well as any primary alcohol groups in conventional vinyl alcohol containing vinyl polymers are sterically hindered That is to say that because these alcohol groups are pendant directly to the polymer chain, the polymer sterically hinders and interferes with these alcohol groups accessing the polyisocyanate. Since the alcohol groups have more difficulty in accessing the polyisocyanate, they are less reactive with the polyisocyanate. In turn, less reactivity leads to greater proportions of unreacted polymer after a set period of curing.

Another advantage obtained from using the magnetic particle coating compositions described herein is that in spite of the fact that the low molecular weight, high Tg vinyl polymer is more reactive with polyisocyanate than conventional vinyl polymers, surprisingly, the pot-life of the coating composition, i.e., the period before which the coating composition cross-links in situ, is even longer than the pot-life of conventional systems.

Still another advantage obtained from using the magnetic particle coating compositions described herein is that when used with flexible substrates, the resulting magnetic recording media is more calenderable. In particular, flexible magnetic recording media obtained by using the coating compositions described herein can in some cases obtain the desired degree of gloss after one pass through the rolls; whereas flexible magnetic recording media obtained by using conventional coating compositions generally do not achieve the same desired level of gloss even after several passes through the rolls.

Magnetic particle coating compositions can optionally contain additives such as dispersants, lubricants, abrasives, and the like. Specific examples of dispersants which can be employed in the magnetic particle coating composition include aliphatic carboxylic acids having 12 to 18 carbon atoms such as caprylic acid, capric acid, lauric acid, myristic acid, palmitic acid, stearic acid, oleic acid, elaidic acid, linolic acid, linoelic acid, stearolic acid, and the like; metallic soaps comprising alkali metal (lithium, sodium, potassium, etc.) or alkaline earth metal (magnesium, calcium, barium, etc.) salts of the above-described aliphatic carboxylic acids; fluorine containing compounds of the above-described aliphatic carboxylic acid esters; amides of the above-described aliphatic carboxylic acids; polyalkylene oxide alkyl phosphates; lecithin; trialkyl polyolefinoxy quaternary ammonium salts (wherein the alkyl group has 1 to 5 carbon atoms, and the olefin is exemplified by ethylene, propylene, etc.); and the like. In addition, higher alcohols having more than 12 carbon atoms and the sulfuric acid esters thereof and the like can also be employed. These dispersants are generally employed from about 2 to about 7 weight percent based on the weight of the magnetic particles.

Alternatively, in lieu of using one or more the above dispersant, it is contemplated that a polymeric dispersant such as polymeric dispersants available from Nippon Zeon Kawasaki, Japan under the tradename MR-110 can be employed. When so employed, the polymeric dispersant becomes part of the binder system. The polymeric dispersant is generally employed at from about 0.1 weight percent to about 12 weight percent based on the weight of the magnetic particles.

Typical lubricants which can be employed in the magnetic particle coating composition include finely divided electrically conductive powders such as graphite, etc.; finely divided inorganic powders such as molybdenum disulfide, tungsten disulfide and the like; finely divided synthetic resin powders such as those of polyethylene, polypropylene, polyethyenevinyl chloride copolymers, polytetrafluoroethylene and the like; alpha olefins polymers; unsaturated aliphatic hydrocarbons which are liquid at normal temperature (compounds in which an n-olefin double bond is positioned at the terminal thereof, with about 5 to about 20 carbon atoms); aliphatic monocarboxylic acids having 10 to 22 carbon atoms, including acids such as myristic acid, lauric acid, aliphatic acid esters of aliphatic monocarboxylic acids having 10 to 22 carbon atoms and monovalent alcohols having 3 to 1 carbon atoms, and the like, including esters such as ethyl stearate, butoxy ethyl stearate, and the like. The lubricants are generally employed at from about 0.5 weight percent to about 4 weight percent based on the weight of the magnetic particle coating composition (excluding solvent).

Specific examples of abrasives which can be employed in magnetic particle coating compositions include aluminum oxide, silicon carbide, chromium dioxide, corundum, artificial corundum, diamond, artificial diamond, garnet, emery (with the main components being corundum and magnetite), and the like. These abrasives have a Mohs, hardness above about 5. Preferably, the abrasives employed have an average particle size of about 0.05 to about 5 microns, more preferably 0.1 to about 2 microns. These abrasives are generally employed in an amount of from about 0.4 to about 15.0 weight percent based on the weight of the magnetic coating composition (absent solvent).

If desired, a topcoat can be placed over the magnetic layer in the magnetic recording media. Such topcoats are conventional and generally contain a wear resistant layer, a lubricant and/or antioxidant layer, and the like. Application of such topcoats are well known in the art. For example, application of lubricant topcoat compositions can be conducted by roll coating methods or alternatively, by evaporation, dippinq and spraying techniques. Likewise, application of a wear resistant layer can be conducted, for example, by sputtering and other means.

Magnetic recording media, including metal thin film recording media, can optionally employ a backcoat. When employed, the backcoat is placed on the side of the substrate opposite the side containing the magnetic layer. Such backcoats are conventionally employed to improve the conductivity of the magnetic recording medium, especially flexible magnetic recording medium, and to improve the wear resistance of the substrate and generally contain an antistat.

Another advantage of the binder system described hereinabove is that these systems are also useful in backcoat compositions for magnetic recording media, including metal thin film magnetic recording media as well as magnetic particle recording media. When so employed, the binder system, employed in the ratios hereinabove described, is generally combined with an antistat, an organic solvent and optionally a lubricant and a dispersant.

In view of the above, another composition aspect of the present invention is directed toward a backcoat composition comprising a) an organic solvent, b) polyurethane, c) polyisocyanate, d) a low molecular weight, high Tg vinyl polymer characterized by having one or more primary alcohol containing groups pendant to the non-terminal portions thereof, and e) an antistat.

In another composition aspect, the present invention is directed toward a magnetic recording medium comprising a non-magnetic substrate, a magnetic layer and a backcoat derived from a backcoat composition which comprises a) an organic solvent, b) polyurethane, c) polyisocyanate, d) a low molecular weight, high Tg vinyl polymer characterized by having one or more primary alcohol containing groups pendant to the non-terminal portions thereof, and e) an antistat.

The organic solvents described above for use in magnetic particle coating compositions can also be employed in the backcoat compositions provided that such solvents are compatible with the additives employed and the substrate to which the composition is applied. However, in the backcoat compositions, the organic solvent can be present in amounts up to about 90 percent by weight based on the total weight of the backcoat composition. In general, the organic solvent is present in amount from about 45 to about 90 percent by weight based on the total weight of the backcoat composition.

Examples of antistats which can be employed in magnetic particle coating compositions include finely divided electrically conductive powders such as graphite, carbon black, carbon black graft polymers and the like; natural surface active agents such as saponin, etc.; nonionic surface active agents such as alkylene oxide type, glycerin type, glycidol type and the like surface active agents; cationic surface active agents such as higher alkyl amines, quaternary ammonium salts, pyridines or other heterocyclic compounds, phosphoniums or sulfoniums and the like; anionic surface active agents containing an acidic group derived from a carboxylic acid group, a sulfonic acid group or a phosphoric acid group, a sulfuric acid ester group, a phosphoric acid ester group and the like; amphoteric surface active agents such as sulfuric acid esters or phosphoric acid esters, etc., of amino acids, aminosulfonic acids, amino alcohols and the like. These antistats are generally employed in an amount of from about 10 to about 50 weight percent based on the weight of the backcoat composition (without solvent).

It is also contemplated that the above antistats can be optionally employed in the magnetic coating compositions described above in order to impart antistat and improved durability to the media. However, because use of antistats in magnetic particle coating compositions often result in adverse output performance, their use is not preferred. In any event, when used in magnetic particle coating compositions, the antistats are generally employed at from about 0.3 to about 10 weight percent based on the weight of magnetic coating composition (without solvent).

Likewise, the dispersants and lubricants described above for the magnetic particle coating compositions can also be employed in backcoat compositions. However, when so used, the dispersant is generally employed in an amount of from about 1 to about 10 weight percent based on the total weight of the backcoat composition (absent solvent); whereas the lubricant is generally employed in an amount of from about 0.3 to about 12 weight percent based on the total weight of the backcoat composition (again absent solvent).

The backcoat composition is generally applied to the substrate opposite the side containing the magnetic layer. Application of the backcoat is well known in the art. For example, application of the backcoat can be conducted by roll coating methods. The thickness of the resulting backcoat is generally from about 0.1 to about 3 microns.

The present invention will be described in further detail with reference to examples and comparative examples. However, it should be understood that the present invention is by no means restricted by these specific examples.

EXAMPLES

Comparative Example A—Preparation of a Magnetic Particle Coating Composition A conventional magnetic particle coating composition was prepared by first preparing a magnetic slurry. The magnetic slurry was sandmilled with a composition containing the following components (in this composition all weight percents are reported based on the total weight of the magnetic slurry):

A. 748 g of a polyesterurethane (0.98 weight percent) available from BF Goodrich under the tradename 5701 Fl. This polyesterurethane has a Tg of about $-20°$ C. and a number average molecular weight of about 50,000;

B. 498 g of a vinyl chloride/vinyl acetate/vinyl alcohol terpolymer (0.65 weight percent) available from Union Carbide under the tradename VAGH. This terpolymer has a Tg of about 79° C. and a number average molecular weight of about 30,000;

C. 138 g of butoxy ethyl stearate (lubricant, 0.18 weight percent);

D. 470 g of myristic acid (lubricant, 0.61 weight percent);

E. 258 g of adipic acid (metal particle deactivator, 0.34 weight percent);

F. 344 g of lecithin (dispersant, 0.45 weight percent);

G. 756 g of GAFAC RE 610 (dispersant available from GAFAC under the tradename RE 610, 0.99 weight percent);

H. 1,330 g of aluminum oxide (abrasive, 1.75 weight percent);

I. 25,912 g of alpha iron powder (magnetic particles, 34.03 weight percent); and J. 45,682 g of cyclohexanone (solvent, 60 weight percent).

(Total weight of slurry equals 76,136 g)

After a fine dispersion was attained for the magnetic slurry, a conventional magnetic particle coating composition was prepared by adding the following additional components to the one-half of the above slurry:

K. 1,668 g of a polyesterurethane available from BF Goodrich under the tradename 5701 Fl;

L. 328 g of a vinyl chloride/vinyl acetate/vinyl alcohol terpolymer available from Union Carbide under the tradename VAGH;

M. 844 g of a polyisocyanate available from Mobay Corp., Coating Division under the tradename CB-701;

N. 5,362 g of cyclohexanone; and

O. 9,401 g of tetrahydrofuran.

Total Weight of the magnetic coating composition, i.e., components ½(A-J)+K-O, was 55,670 g.

Example 1—Preparation of a Magnetic Particle Coating Composition Containing a Low Molecular Weight High Tg, Vinyl Polymer Having One or More Primary Alcohol Containing Groups Pendant to its Non-terminal Portions The remaining one-half of the fine dispersion of magnetic slurry prepared in Comparative Example A was employed to prepare a magnetic particle coating composition by adding the following additional components to the slurry:

P. 859 g of a polyesterurethane available from BF Gooodrich under the tradename 5701 Fl;

Q. 328 g of a vinyl chloride/vinyl acetate/vinyl alcohol terpolymer available from Union Carbide under the tradename VAGH.

R. 849 g of a vinyl polymer containing one or more primary alcohol groups in the non-terminal portions of the polymer, having a Tg of about 43° C. and a number average molecular weight of about 2,000 and which is available from Union Carbide under the tradename VP-200. (Note—this polymer is supplied in solution with methyl ethyl ketone and the weight reported herein represents dry weight for the polymer, i.e., without this solvent);

S. 844 g of a polyisocyanate available from Mobay Corp., Coating Division under the tradename CB-701;

T. 1,671 g of cyclohexanone;

U. 8,095 g of tetrahydrofuran; and

V. 299 g methyl ethyl ketone (from the VP-200).

Total weight of this magnetic particle coating composition, i.e., components ½(A-J) and P-V was 51,013 g.

In regard to Example 1, this example was prepared with a higher solids content than Comparative Example A so as to attain similar viscosities between these two coating compositions. This was necessary because of the viscosity reducing nature of VP-200.

Example 2—Preparation of Magnetic Particle Recording Media

Magnetic particle coating compositions set forth in Comparative Example A and Example 1 above were both filtered through 2 micron absolute metal filters and each composition then coated onto separate pieces of the same polyester terephthalate film using reverse roll methodology employing a knife over a reverse roll coater which resulted in a coating thickness of three microns for each composition on separate pieces of 38 gauge tensilized polyester terephthalate film.

Alternatively, by following the procedures employed in Examples 1 and 2 above, magnetic particle recording media could be prepared by employing metal oxide particles in place of metal particles; by employing an inflexible substrate in place of the flexible substrate; and by employing other high Tg, low molecular weight vinyl polymers having one or more primary alcohol groups pendant to the non-terminal portions thereof such as vinyl polymers commercially available from Union Carbide, Danbury, Conn., under the tradenames VYES and VROH.

Example 3—Gloss Measurements

60° gloss of each coating was measured non-calendered, 2 pass calendered, and 8 pass calendered. Gloss measurements were obtained by first measuring the amount reflectance of light at 60. for a standard black glass material. Then, in the same geometry, the gloss measurements were made for each coating as noted above and compared to reference. In this test, higher gloss values reflect superior gloss properties which in turn relate to a smoother surface and correlates to better signal to noise output for the resulting magnetic recording media. Gloss values were as follows (percents all relative to standard):

|  | Comparative Ex. A | Ex. 1 |
| --- | --- | --- |
| Non-calendered | 74% | 87% |
| 2 pass calendered | 166% | 174% |
| 8 pass calendered | 182% | 192% |

In each case, coatings obtained from the coating composition employing a low molecular weight, high Tg vinyl polymer having one or more primary alcohol groups pendant to the non-terminal portions provided for superior gloss as compared to coatings obtained from conventional coating compositions.

Example 4—Still-frame test and Electrical Properties

After curing, the magnetic recording media of Example 2 (obtained from the magnetic coating compositions of Comparative Example A and Example 1) were placed in a still-frame test which is a technique of measuring the integrity and surface lubricity of the magnetic recording medium. The still-frame test was conducted by measuring the output signal from the tested magnetic tape during a period of time on the still-frame of a commercial VHS VCR. The medium fails this test when the signal output falls below 2 dB of the recorded signal during the test. The results of this test are as follows:

| Magnetic Recording Medium obtained from the Coating Composition of | Results |
| --- | --- |
| Comparative Ex. A | Fails test within 10 minutes |
| Example 1 | Only 0.18 dB signal loss after 8 hours. |

The above results indicate that the magnetic recording medium derived from Example 1 provides superior polymer integrity and lubricity as compared to the magnetic recording medium derived from Comparative Example A.

Additionally, the electrical performance of the cured magnetic recording media of Example 2 (obtained from using the magnetic coating composition of Example 1 and Comparative Example A) indicates that the magnetic recording medium derived from Example 1 is superior to that derived from Comparative Example A. In particular, tape saturated output was measured at 100 kilo flux reversal per inch frequency. Output for magnetic recording medium derived from Example 1 was 4.1 dB higher than for that derived from Comparative Example A. Likewise, the modulation signal to noise was 2.4 dB better for the magnetic recording medium derived from Example 1 as compared to that derived from Comparative Example A. Also, the Betacam SP RF output was 0.7 dB better for the magnetic recording medium derived from Example 1 as compared to that derived from Comparative Example A. Each of these electrical characteristics indicates that the electrical performance of the magnetic recording medium derived from Example 1 is superior to that derived from Comparative Example A.

Example 5—Pot-Life

The pot-life of a magnetic coating composition is a measure of the rate of the reaction of the binder system once these components have been combined with the magnetic coating composition. If the pot-life is too short, then sufficient time is not available to apply all of the coating composition onto the substrate. On the other hand, too long of a pot-life means that the binder system will not cure in a reasonable period of time, i.e., the binder system's components are not sufficiently reactive with each other. The pot-life of a magnetic coating composition is typically measured by the length of time it takes for one-half of the isocyanate concentration to disappear from the coating composition wherein disappearance is due to reaction of the isocyanate in the magnetic coating composition. This time is reported as $t_{\frac{1}{2}}$. Preferably, for the reasons noted above, it is desirable that the $t_{\frac{1}{2}}$ of the magnetic coating composition be greater than about 6 hours and less than about 30 hours. The pot-life of the magnetic coating composition of Example 1 was compared to that of Comparative Example A wherein isocyanate concentration was determined via infrared spectroscopy. The results of this test are as follows:

| Magnetic Coating Composition of | $t_{\frac{1}{2}}$ |
| --- | --- |
| Comparative Example A | 6.8 hours |
| Example 1 | 10.6 hours |

The above data demonstrates that the pot-life of the composition of Example 1 is longer than that of Comparative Example A but still significantly less than 30 hours, and, accordingly, means that the composition of Example 1 need not be applied to the substrate as fast as that of Comparative Example A.

Example 6—Percent Solvent Extractables

The amount of reaction (cross-linking) of the binder system's components is measured by solvent extracting a magnetic recording medium after it has cured for a set period of time. This test is based on the fact that unreacted components will be extractable from the medium by the solvent whereas reacted (cross-linked) components will not be extractable. In this test, the magnetic recording media of Example 2 were both allowed to cure and then were solvent extracted by the same amount of each medium into the same amount of solvent, which in this case was methyl ethyl ketone, for the same set period of time. Afterward, the solvent is evaporated and the amount of extractables measured. The amount of extractables is reported as a percentage of the total weight of the binder system employed. Higher percentages of extractables correlate to more unreacted components. The results of the this test are as follows:

| Magnetic Recording Medium of Example 2 derived from | % extractables |
| --- | --- |
| Example 1 | 5.6% |
| Comparative Example A | 7.3% |

The above data demonstrates that there is a greater degree of cross-reactivity in the magnetic recording medium derived from Example 1 as compared to that derived from Comparative Example A. This is particularly surprising because the results of Example 5 indicate that the binder system employed in Example 1 is reacts slower than the binder system employed in Comparative Example A.

What is claimed is:

1. A magnetic particle recording medium comprising a non-magnetic substrate having a magnetic layer placed thereon wherein said layer is derived from a magnetic particle coating composition which comprises a) magnetic particles, b) polyurethane, c) polyisocyanate, and d) a low molecular weight, high Tg vinyl polymer having a Tg of about 40° C. or more and a number average molecular weight of about 15,000 or less and characterized by having one or more primary alcohol containing groups pendant to the non-terminal portions thereof.

2. A magnetic particle recording medium as defined in claim 1 wherein said magnetic particle coating composition further comprises an organic solvent.

3. A magnetic particle recording medium as defined in claim 2 wherein said organic solvent comprises a ketone solvent.

4. A magnetic particle recording medium as defined in claim 3 wherein said ketone solvent is selected from the group consisting of cyclohexanone, methyl ethyl ketone, and methyl isobutyl ketone.

5. A magnetic particle recording medium as defined in claim 3 wherein said ketone solvent is a mixture of cyclohexanone and tetrahydrofuran.

6. A magnetic particle recording medium as defined in claim 1 wherein said magnetic particles are metal particles.

7. A magnetic particle recording medium as defined in claim 6 wherein said metal particles are iron metal powder.

8. A magnetic particle recording medium as defined in claim 1 wherein said magnetic particles are metal oxide particles.

9. A magnetic particle recording medium as defined in claim 1 wherein said polyurethane employed in said magnetic particle coating composition has a Tg of about 25° C. or less.

10. A magnetic particle recording medium as defined in claim 9 wherein said polyurethane has a number average molecular weight of from about 10,000 to about 200,000.

11. A magnetic particle recording medium as defined in claim 1 wherein said low molecular weight, high Tg vinyl polymer has a number average molecular weight of about 10,000 or less.

12. A magnetic particle recording medium as defined in claim 11 wherein said low molecular weight, high Tg vinyl polymer has a number average molecular weight of about 5,000 or less.

13. A magnetic particle recording medium as defined in claim 12 wherein said low molecular weight, high Tg vinyl polymer has a number average molecular weight of about 3,000 or less.

14. A magnetic particle recording medium as defined in claim 1 wherein the Tg of the magnetic layer is about 30° C. or more.

15. A magnetic particle recording medium as defined in claim 1 wherein said magnetic particle coating composition further comprises a vinyl chloride/vinyl acetate/vinyl alcohol terpolymer having a number average molecular weight of about 20,000 or more and a Tg of about 40° C. or more.

16. A magnetic particle recording medium as defined in claim 1 wherein said magnetic particle coating composition further comprises an abrasive, a dispersant, and a lubricant.

17. A method of increasing the Tg of the magnetic layer of a magnetic particle recording medium, wherein said magnetic layer is derived from a magnetic particle coating composition comprising magnetic particles, polyurethane and polyisocyanate, said method comprises adding to said composition a low molecular weight, high Tg vinyl polymer having a Tg of about 40° C. or more and a number average molecular weight of about 15,000 or less and characterized by having one or more primary alcohol containing groups pendant to the non-terminal portions thereof.

18. A method as defined in claim 17 wherein said low molecular weight, high Tg vinyl polymer is added to said magnetic particle coating composition in an amount sufficient to provide a Tg in the magnetic layer of about 30° C or more.

19. A method as defined in claim 18 wherein said low molecular weight, high Tg vinyl polymer is added to said magnetic particle coating composition in an amount sufficient to provide a Tg in the magnetic layer of about 40° C or more.

20. A method as defined in claim 17 wherein said low molecular weight, high Tg vinyl polymer has a number average molecular weight of about 10,000 or less.

21. A method as defined in claim 20 wherein said low molecular weight, high Tg vinyl polymer has a number average molecular weight of about 5,000 or less.

22. A method as defined in claim 21 wherein said low molecular weight, high Tg vinyl polymer has a number average molecular weight of about 3,000 or less.

23. A magnetic recording medium comprising a non-magnetic substrate, a magnetic layer and a backcoat derived from a backcoat composition which comprises a) an organic solvent, b) polyurethane, c) polyisocyanate, d) a low molecular weight, high Tg vinyl polymer having a Tg of about 40° C. or more and a number average molecular weight of about 15,000 or less and characterized by one or more primary alcohol containing groups pendent to the non-terminal portions thereof, and e) an antistat.

24. A magnetic recording medium as defined in claim 23 wherein in said backcoat composition said organic solvent comprises a ketone solvent.

25. A magnetic recording medium as defined in claim 24 wherein said ketone solvent is selected from the group consisting of cyclohexanone, methyl ethyl ketone, and methyl isobutyl ketone.

26. A magnetic recording medium as defined in claim 24 wherein said ketone solvent is a mixture of cyclohexanone and tetrahydrofuran.

27. A magnetic recording medium as defined in claim 23 wherein, in said backcoat composition, said polyurethane has a Tg of about 25° C. or less.

28. A magnetic recording medium as defined in claim 27 wherein said polyurethane has a number average molecular weight of from about 10,000 to about 200,000.

29. A magnetic recording medium as defined in claim 23 said low molecular weight, high Tg vinyl polymer has a number average molecular weight of about 3,000 or less.

30. A magnetic recording medium as defined in claim 23 wherein said backcoat composition further comprises a dispersant and/or a lubricant.

31. A magnetic recording medium as recited in claim 23 wherein said magnetic layer is derived from a magnetic particle coating composition which comprises (a') magnetic particles, (b') polyurethane, (c') polyisocyanate, and (d') a low molecular weight, high Tg vinyl polymer characterized by having one or more primary alcohol containing groups pendant to the non-terminal portions thereof.

* * * * *